United States Patent [19]

Toth

[11] Patent Number: 4,813,835

[45] Date of Patent: Mar. 21, 1989

[54] WHEEL NUT

[75] Inventor: John A. Toth, Farmington Hills, Mich.

[73] Assignee: Key Manufacturing Group, Inc., Southfield, Mich.

[21] Appl. No.: 86,250

[22] Filed: Aug. 14, 1987

Related U.S. Application Data

[63] Continuation of Ser. No. 675,369, Nov. 26, 1984, abandoned.

[51] Int. Cl.$^4$ ............................................. F16B 37/14
[52] U.S. Cl. ..................................... 411/429; 411/432
[58] Field of Search ............... 411/429, 430, 373, 374, 411/377, 371, 431, 372, 432, 435, 375, 376, 517, 516, 531; 10/86 C; 301/9 R, 9 DH, 37 AT, 37 SC, 111

[56] References Cited

U.S. PATENT DOCUMENTS

| 154,255 | 8/1874 | Ives | 411/429 |
|---|---|---|---|
| 218,425 | 8/1879 | Bradley | 411/429 |
| 443,799 | 12/1890 | Searls | 411/429 |
| 819,158 | 5/1906 | Neider | 411/373 X |
| 1,374,106 | 4/1921 | Perlman | 411/432 X |
| 1,381,437 | 6/1921 | Smith | 411/432 X |
| 2,708,844 | 5/1955 | Cincel | 411/378 X |
| 3,857,611 | 12/1974 | Pansky et al. | 301/9 DN |
| 4,018,133 | 4/1977 | Chaivre et al. | 411/429 |
| 4,123,961 | 7/1978 | Chaivre et al. | 411/429 |
| 4,169,630 | 10/1979 | Wagner | 301/9 DN |
| 4,201,110 | 5/1980 | Hanai et al. | 411/429 |
| 4,583,897 | 4/1986 | Briles | 411/531 X |

FOREIGN PATENT DOCUMENTS

| 575341 | 4/1924 | France | 411/435 |
|---|---|---|---|
| 646842 | 7/1928 | France | 411/429 |
| 51-124573 | 10/1976 | Japan | 411/429 |

Primary Examiner—Gary L. Smith
Assistant Examiner—Rodney M. Lindsey
Attorney, Agent, or Firm—Spencer & Frank

[57] ABSTRACT

An improved wheel nut for securing a wheel to a vehicle hub or the like and for retaining a wheel cover on the wheel. The wheel nut preferably includes a nut body and a cap secured to the nut body and an axial gap is provided between the end of the cap and a portion of the nut body. A retaining ring is provided in the axial gap and the retaining ring extends radially outwardly beyond the wheel nut for retaining a wheel cover against the wheel and for precluding removal of the wheel cover unless the wheel nut is first removed.

14 Claims, 2 Drawing Sheets

WHEEL NUT

This is a continuation of application Ser. No. 675,369, filed Nov. 26, 1984, now abandoned.

BACKGROUND OF THE INVENTION

This invention relates to wheel nuts and, more particularly, to an improved wheel nut for retaining a wheel to a hub and simultaneously retaining a wheel cover in position on the wheel.

There were, prior to the present invention, basically three types of wheel nuts, often referred to as wheel lugs, for retaining vehicle wheels to hubs. The "hub" refers to the end of the axle where the wheel is mounted. The hub has a plurality of threaded studs, such as five, extending outwardly therefrom and a wheel, having five apertures, is mounted on the hub by aligning the apertures in the wheel with the studs on the hub. The wheel, of course, is provided with a circumferentially mounted tire. Once the wheel is mounted on the hub, wheel nuts are threaded onto the studs to retain the wheel on the hub. A decorative wheel cover may then be removably force fit onto the wheel.

The first type of wheel nut heretofore used was a thin, flat disc-like steel member having a central threaded bore therethrough. The nut had six peripheral flat surfaces, called wrench flats, and the nut was hexagonal in plan view. This first type of wheel nut is the oldest type which is still in widespread use.

A second type of wheel nut was the decorative wheel nut which was formed as a single piece chrome plated elongated rod-like member. This one-piece chrome plated wheel nut included an internally threaded bore which extended almost the full length of the nut but the bore was closed at one end. This wheel nut also had a plurality of wrench flats, typically six, so that the wheel nut could be tightened onto the conventional stud extending outwardly of the hub to thereby secure the wheel to the hub. This type of chrome plated wheel nut is commercially available.

A third type of wheel nut utilized a steel nut body to which a stainless steel decorative cap was attached. The nut body was similar to the first type of wheel nut including a central threaded bore and a plurality of wrench flats. The decorative cap covered one end of the bore as well as the wrench flats. Thus the cap protected the end of the stud from damage due to weather, impact or the like and, when the capped wheel nuts were threaded on to the studs to secure the wheel to the hub, essentially only the decorative stainless steel cap was visible. The capped wheel nut is also commercially available.

Numerous types of "wheel covers" or "hub caps" have been marketed to enhance the appearance of the wheel mounted on the hub. Where the first type of lug nuts are utilized, the wheel cover or hub cap is attached to the wheel to hide and protect the nuts and the studs. Where either the one-piece chrome plated wheel nuts or the capped wheel nuts are utilized, two alternate types of covers were used. In the first type, there were a plurality of apertures in the wheel cover so that when the wheel cover is in place on the wheel, the capped wheel nuts (or alternatively the chrome wheel nuts) extend through the apertures in the wheel cover. In the second type there were no apertures in the cover but the cover was of a sufficiently small diameter so that there was no interference between the wheel cover and the wheel nuts.

Typically, the wheel cover has a plurality of resilient protrusions which engage the wheel for retaining the wheel cover on the wheel. Occasionally, however, a wheel cover will fall off the wheel when the vehicle is driven on bumpy roads or in the event of improper placement of the wheel cover on the wheel such as after changing a tire or the like.

There have been various attempts to solve the problem of inadvertent removal of (or even theft of) the wheel cover. As discussed in greater detail, none of these has been totally satisfactory.

In addition, as wheel covers become more decorative and more expensive, a problem has arisen in that many wheel covers are stolen since typically a flat-bladed screwdriver may be sufficient to dislodge the wheel cover from the wheel. This is especially true with new cars where wheel covers are often stolen from the car dealer. Hence many cars are shipped from the factory with wheel covers in the trunk.

SUMMARY OF THE INVENTION

The present invention provides an improved wheel nut of the type including a nut body and a cap wherein a retaining ring is interposed between the nut body and the cap, the retaining ring being in the nature of a radially outwardly extending peripheral flange. When the capped wheel nuts are secured on the studs which extend outwardly from the hub, and with wheel cover in place, the wheel cover is positioned between the hub and the retaining ring on each of the wheel nuts. The radial flanges or retaining rings extend radially outwardly a sufficient distance such that the wheel covers may not be removed without first removing each of the capped wheel nuts. While retaining rings have been used with wheel nuts for this purpose, the prior attempts (as discussed in greater detail) have not been totally satisfactory, as will be explained.

In addition, the cap of the capped wheel nut now provides a new function. In the past, the cap served not only as a decorative member but also provided the wrenching flats. Now, according to the principles of the present invention, the cap also functions as a stop member for the retaining ring, thus aiding in maintaining the retaining ring in position.

BRIEF DESCRIPTION OF THE DRAWINGS

The various features, benefits and advantages of the present invention, together with other advantages which may be attained by its use, will become more apparent upon reading the following detailed description of the invention taken in conjunction with the drawings.

In the drawings, wherein like reference numerals identify corresponding components.

DETAILED DESCRIPTION OF THE INVENTION

Figure 1:
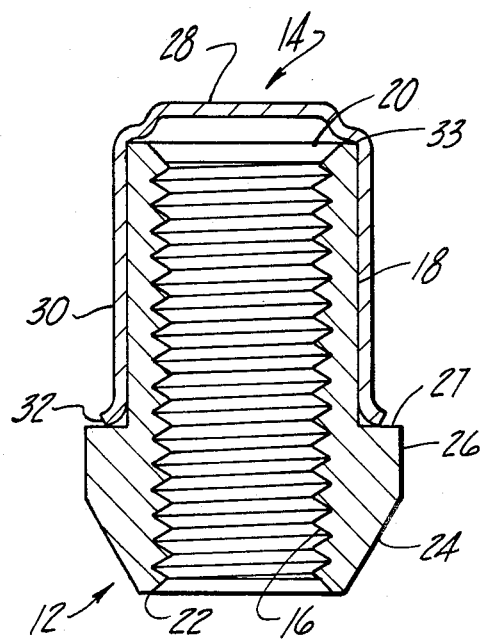
FIG. 1 is a sectional illustration of a prior art capped wheel nut.

With reference to FIG. 1, a capped wheel nut is illustrated in sectional view. The capped wheel nut may be of the type disclosed in U.S. Pat. No. 4,123,961 issued Nov. 7, 1978. Typically the capped wheel nut includes a steel nut body 12 and a stainless steel cap 14.

The nut body 12, often called a nut insert, has a central threaded aperture 16 and plurality of wrench flats 18 arranged generally parallel to the elongated axis of the nut body. It is conventional to provide six such wrench flats and thus in an end view the nut body is of hexagonal configuration.

The nut body 12 has first and second ends 20, 22 and the second end is typically formed with a conical surface 24 that is adapted to mate with the conical depressions typically formed around stud holes in vehicle wheels. The conical section terminates in a short cylindrical land 26.

At the top of the land 26 the nut body may be provided with a shoulder 27. The land 26 is like a radial flange on the nut body.

The nut body 12 is covered by a sheath or cap preferably formed of stainless steel. The cap includes a top 28 which may be domed, flat or recessed. The top 28 covers the first end 20 of the nut body and a downwardly extending skirt portion 30 which extends over the wrench flats 18. The skirt portion 30 may be configured to correspond to the wrench flats 18. The free end 32 of the skirt portion of the cap, i.e., the end opposite the top, may extend radially outwardly a short distance and may correspond in outside diameter to the outside diameter of the land portion 26 of the nut body. There will be some nominal clearance between the free end 32 of the cap and the shoulder 27 on the nut body. Typically, that clearance would be less than 0.1 millimeters and is provided purely as a clearance. The cap may preferably be secured to the nut body by welding as at 33. The structure heretofore described with reference to FIG. 1 is considered to prior art.

Figure 2:
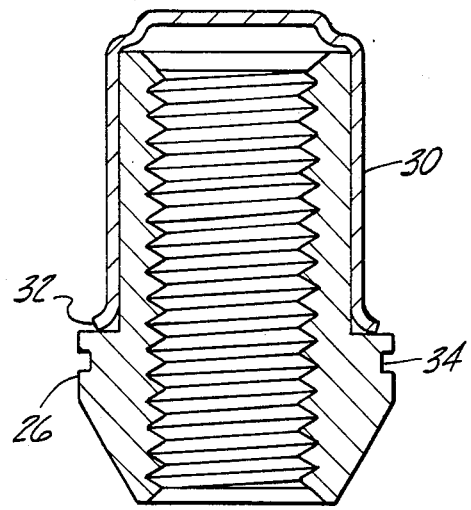
FIG. 2 is a sectional illustration of a prior art capped wheel nut which provides for a retaining ring.

With reference to FIG. 2, a prior art approach to solving the problem of retaining the wheel cover on the wheel will now be described. This prior art approach envisions machining a circumferential groove 34 in the land 26 on the nut body so that a retaining ring may be placed in the groove 34. The retaining ring would extend outwardly from the groove and would retain the wheel cover against both accidental dislodgement and deliberate removal unless the wheel nuts were removed.

There are numerous problems with this prior art approach, not the least of which is the expense involved in machining the groove in the nut body.

Figure 3:
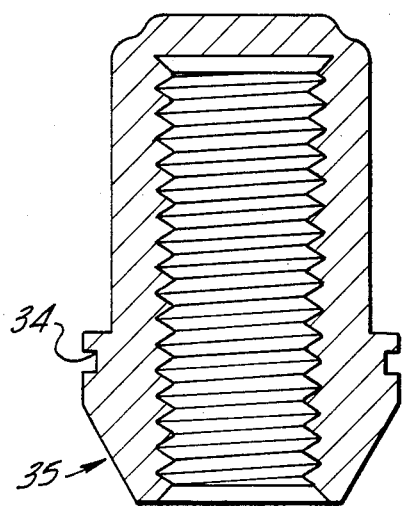
FIG. 3 is a sectional illustration of a prior art one piece nut which provides for a retaining ring.

A second approach to retaining the wheel cover on the wheel has been suggested for use with a one-piece, chrome-plated wheel nut 35. Specifically the one-piece nut, as illustrated in FIG. 3, is initially formed with a groove 34. Again a retaining ring is positioned in the groove. While this type of device has worked satisfactorily, it must be understood that one-piece chrome-plated wheel nuts are relatively expensive, and have other undesirble features. Thus the one-piece nut is not totally satisfactory.

Figure 4:
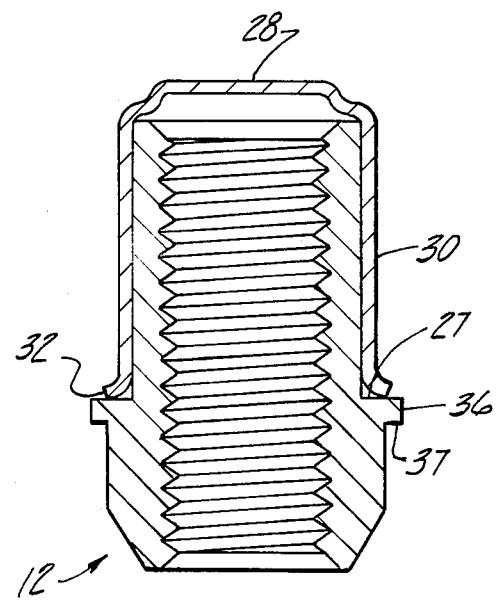
FIG. 4 is a sectional illustration of a prior art capped wheel nut which includes a retaining flange on the nut body.

FIG. 4 illustrates yet another prior art approach where the nut body 12 includes a radial flange 36 in place of the land 26. The flange 36 cooperates with a clip or the like on the wheel cover (not shown) so that the wheel cover is not inadvertently removed. The flange and clip, however, may not provide a full 360° bearing surface on the underside 37 of the flange where contact is made with the cover.

Figure 5:
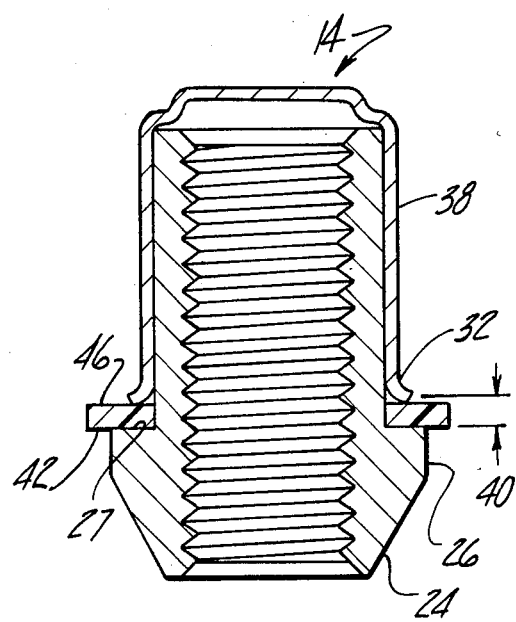
FIG. 5 is a sectional view of a capped wheel nut including a retaining ring according to principles of the present invention.
Figure 6:
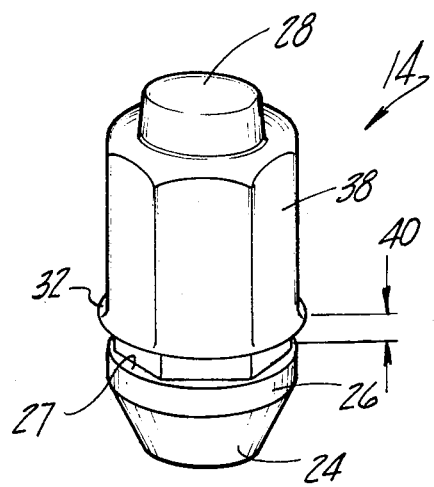
FIG. 6 is a perspective illustration of the capped wheel nut of FIG. 5 with the retaining ring removed for illustrative purposes.

With reference to FIGS. 5 and 6, the present invention will now be explained. The cap 14 of the wheel nut is generally similar to the cap 14 of FIGS. 1, 2 and 4 except that the skirt portion 38 is shorter in an axial distance than the corresponding skirt portion 30 of the cap of FIGS. 1 and 2. The skirt portion 38 is provided with a radially outwardly extending flange 32, corresponding to the flange 32 on skirt portion 30 of the cap of FIGS. 1, 2 and 4. Thus an axial gap 40 is provided between the free end 32 of the cap and the shoulder 27 of the nut body 12. This axial gap, in the preferred embodiment, is sufficient to allow for placement of the retaining ring therein. By way of example and illustration, a retaining ring previously suggested for use with the devices of FIG. 2, and proposed for the present invention has an approximate thickness of about 3.0 millimeters.

Figure 7:
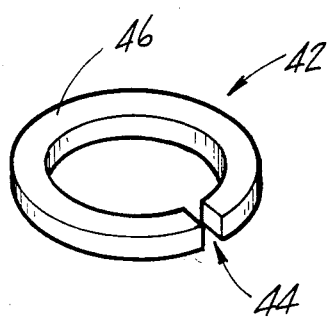
FIG. 7 is a perspective illustration of the retaining ring utilized with the capped wheel nut of the present invention, as well as with the wheel nut of FIGS. 2 and 3.

With reference to FIGS. 5 and 7, the retaining ring 42 is illustrated. The retaining ring may be made of nylon and has a thickness of about 3.0 millimeters. The retaining ring may be a split ring retainer, such as the type having a split 44 through the thickness of the ring, so that the ring may be snapped in place within the axial gap 40 and captured between the shoulder 27 and flange 32. The ring as described is also considered to be prior art because such ring has been suggested for use in the device of FIG. 2 and 3. In such prior uses the retaining ring extends radially outwardly beyond the nut body for retaining the wheel cover on the nut.

When the ring 42 is placed within the axial gap 40, the ring, of course, includes a portion which extends radially outwardly beyond the land 26 of the nut body and flange 32 as is necessary to enable the retaining ring to prevent the wheel cover from being removed. However, according to the principles of the present invention, the retaining ring and particularly the upper surface 46 thereof may abut against the free end 32 of the cap such that the cap, which is secured to the nut body, functions to support the ring, in the nature of a stop member, against substantial axial movement.

In comparison to the one-piece chrome-plated nut body including a retaining ring which is part of the prior art, it should be immediately appreciated that the present invention provides an improved wheel nut and wheel cover retainer system.

What is claimed is:

1. In a capped wheel nut of the type for removably securing a wheel to a motor vehicle or the like, the capped wheel nut including a nut body and a cap secured thereto, the nut body having a central threaded aperture, a first end adapted to engage said wheel, a second end adapted to fit within the cap, and a shoulder intermediate the first and second ends, the cap having a first portion to cover the second end of the nut and a second portion covering the sides of the nut body and terminating in a radially outwardly extending flange, the cap second portion further including wrench flats such that wrenching forces may be applied thereto for engaging said nut body first end against said wheel by application of a wheel engaging force in an axial direction, the improvement comprising:

a gap around the periphery of the nut body, said gap being generally the distance in an axial direction between the radially outwardly extending flange on the cap and the shoulder of the nut body; and a retaining ring extending radially outwardly beyond the shoulder on the nut body, for separately retaining a wheel cover on a wheel, said retaining ring positioned in said gap and captured between said shoulder and said flange.

2. The invention as defined in claim 1, wherein the retaining ring is adapted to abut against the radially outwardly extending flange of said cap.

3. The invention as defined in claim 1, wherein said cap is welded to said nut body.

4. The invention as defined in claim 1, wherein said nut body has polygonal sides and said cap second portion extends over the polygonal sides, said polygonal sides defining wrench flats on said nut body associated with said wrench flats on said cap.

5. The invention as defined in claim 1, wherein said nut body has six sides and said cap second portion has six sides defining said wrench flats.

6. The invention as defined in claim 1, wherein the cap is formed of stainless steel.

7. The invention as defined in claim 1, wherein said retaining ring is formed of nylon.

8. The invention as defined in claim 1, wherein said retainer ring is removably positioned in said gap such that with said wheel nut engaging said wheel, said wheel cover may be positioned on said wheel and thereafter secured by said retaining ring without removing said wheel nut.

9. In a removable capped wheel nut of the type including a nut body having a central threaded aperture, a first end, a second end, and a generally outwardly extending portion therebetween defining a shoulder, and a cap for the nut body, the cap having a first section covering one end of the nut body and a second section covering at least a portion of the nut body and terminating in a radially outwardly extending flange, the improvement comprising:

a gap around the periphery of said nut body, the gap being the distance in an axial direction between the radially outwardly extending flange on the cap and the outwardly extending portion of the nut body; and a retaining ring extending radially outwardly beyond the shoulder on the nut body, for separately retaining a wheel cover on a wheel, said retaining ring positioned in said gap and captured between said shoulder and said flange.

10. The invention as defined in claim 9, wherein the radially outwardly extending flange on said cap extends radially outwardly a lesser distance than the retaining ring.

11. An improved capped wheel nut of the type including a nut body having a central threaded aperture, polygonal sides first and second ends, and a generally outwardly extending portion therebetween, said first end adapted to engage a wheel, and a cap for said nut body, said cap having a first section to extend over the second end of the nut body and a second section extending over the polygonal sides and terminating in a radial flange, the capped wheel nut further comprising:

a gap around the periphery of the capped wheel nut, said gap being the distance between the outwardly extending portion of the body and the flange on the cap; and a retaining ring for retaining a wheel cover on said wheel, said retaining ring positioned in said gap and captured therein for retaining said wheel cover on said wheel against inadvertent removal.

12. The invention as defined in claim 1, wherein said retaining ring is removably positioned in said gap.

13. The invention as defined in claim 1, wherein said retaining ring is trapped between said cap and said nut body to preclude substantial axial movement of the retaining ring.

14. The invention as defined in claim 1, wherein said gap is an axial gap.

* * * * *